United States Patent
Gunji et al.

(10) Patent No.: US 11,438,516 B2
(45) Date of Patent: Sep. 6, 2022

(54) IMAGE PROCESSING APPARATUS AND IMAGE PROCESSING METHOD

(71) Applicant: CANON KABUSHIKI KAISHA, Tokyo (JP)

(72) Inventors: Koichi Gunji, Yokohama (JP); Manabu Umeyama, Yokohama (JP); Yasushi Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 16/901,605

(22) Filed: Jun. 15, 2020

(65) Prior Publication Data

US 2020/0396365 A1    Dec. 17, 2020

(30) Foreign Application Priority Data

Jun. 17, 2019  (JP) .............................. JP2019-112127

(51) Int. Cl.
*H04N 5/235* (2006.01)
*H04N 5/247* (2006.01)
*G06T 11/20* (2006.01)

(52) U.S. Cl.
CPC ......... *H04N 5/2352* (2013.01); *G06T 11/206* (2013.01); *H04N 5/247* (2013.01)

(58) Field of Classification Search
CPC ................. H04N 5/2352; H04N 5/247; H04N 5/232061; H04N 5/2351; H04N 5/232939; G06T 11/206
See application file for complete search history.

(56) References Cited

U.S. PATENT DOCUMENTS

| 10,250,819 | B2 | 4/2019 | Hosono | |
|---|---|---|---|---|
| 2014/0086504 | A1* | 3/2014 | Arai | H04N 19/1883 382/246 |
| 2018/0336783 | A1* | 11/2018 | Kajimoto | G08G 1/096827 |
| 2019/0327423 | A1 | 10/2019 | Sudo | |

FOREIGN PATENT DOCUMENTS

| JP | 2012-134767 A | 7/2012 |
|---|---|---|
| JP | 5538973 B2 | 7/2014 |

* cited by examiner

*Primary Examiner* — Mekonnen D Dagnew
(74) *Attorney, Agent, or Firm* — Cowan, Liebowitz & Latman, P.C.

(57) ABSTRACT

An image processing apparatus that inputs an image, detects a pixel value of each pixel of an input image and obtain at least one of a maximum value, a minimum value, and an average value of pixel values for each of predetermined sections of the input image, generates a first image indicating a frequency of pixel values of the input image, where a position of a pixel and a pixel value are associated, generates a second image in which additional information including at least one of the maximum value, the minimum value, and the average value is superimposed on the first image, and superimposes the second image on the input image and display the result.

19 Claims, 12 Drawing Sheets

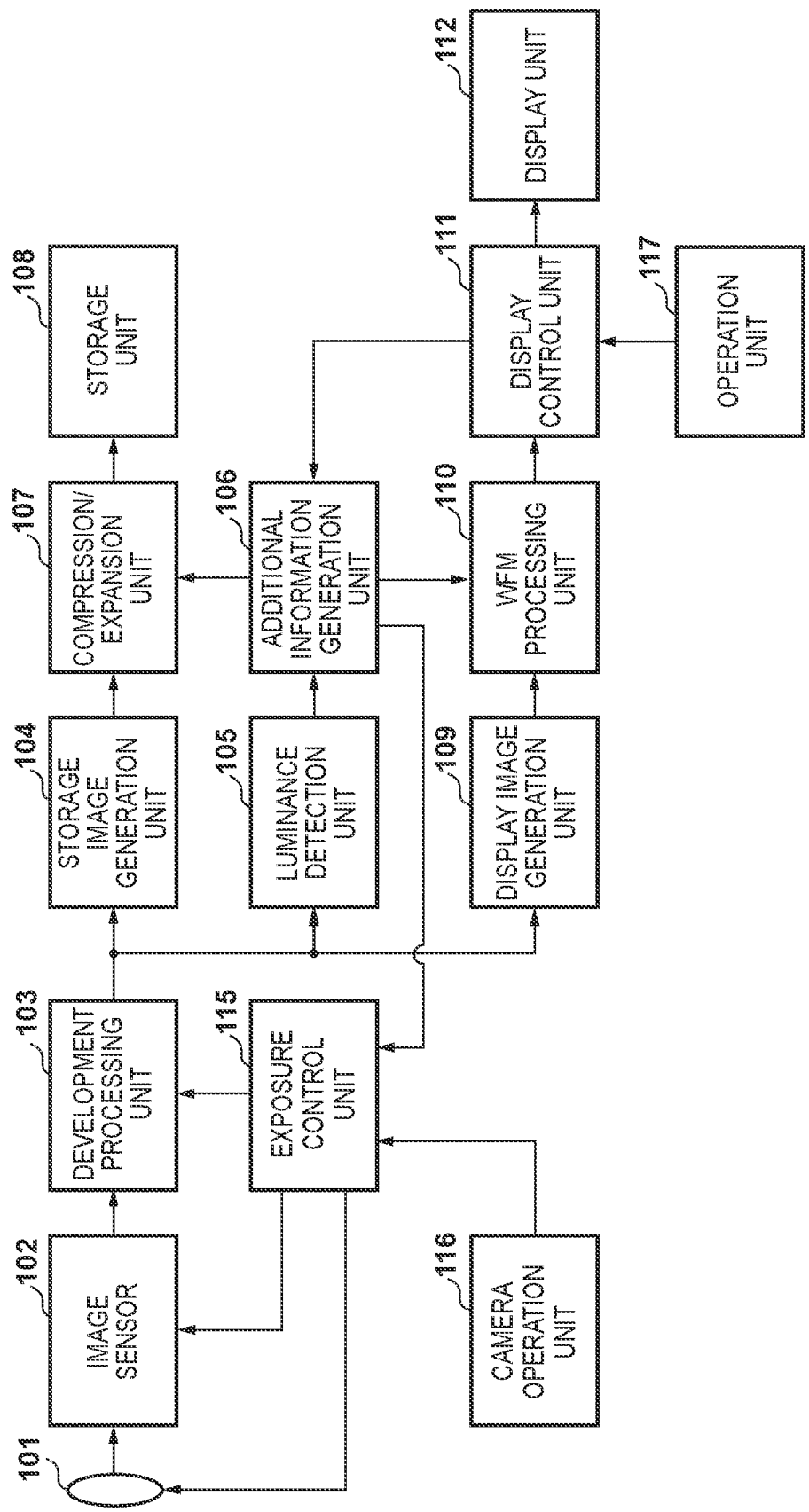

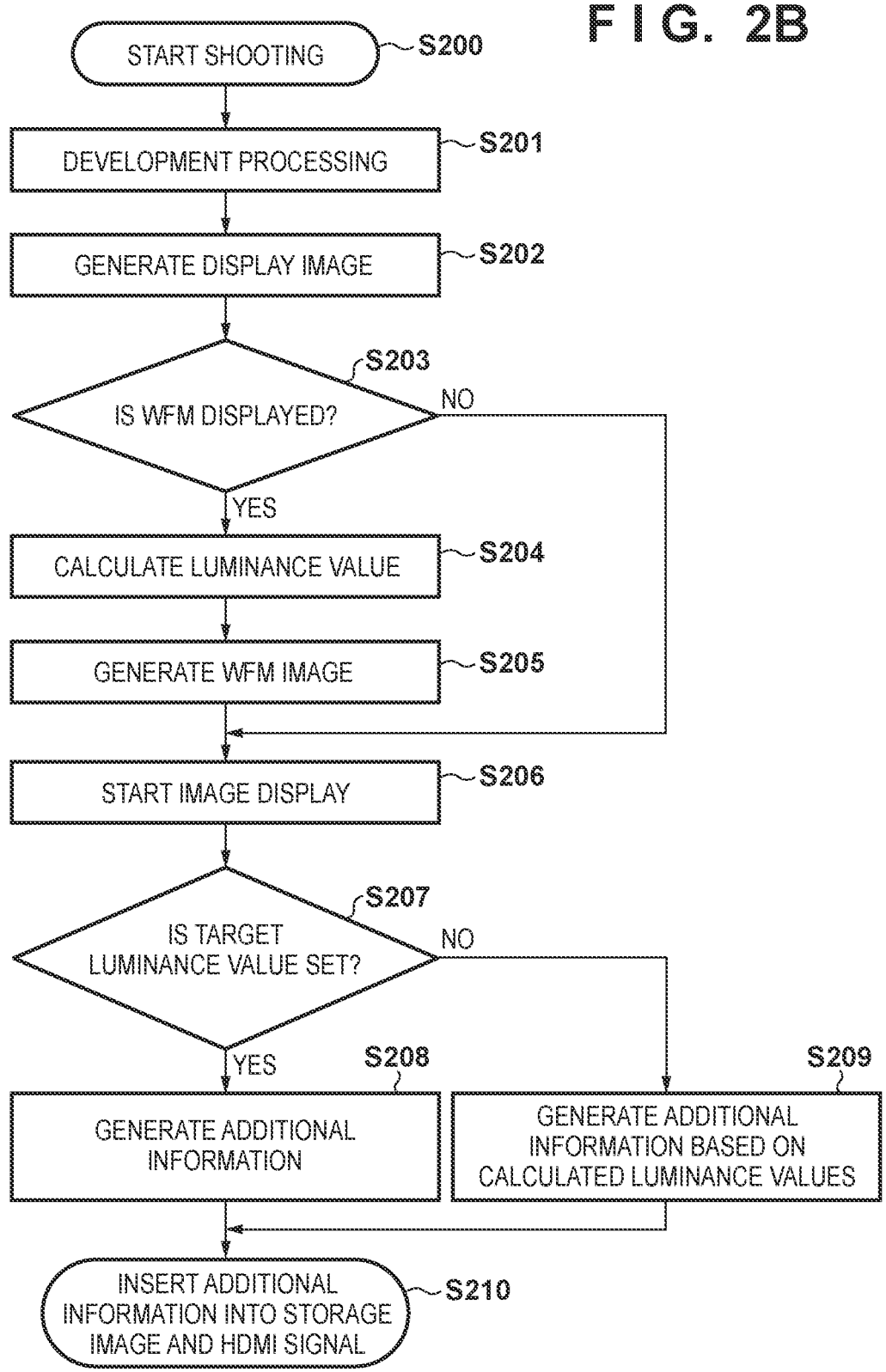

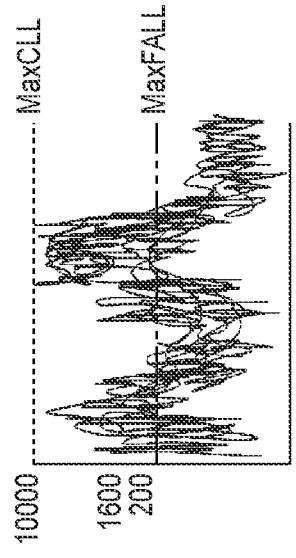
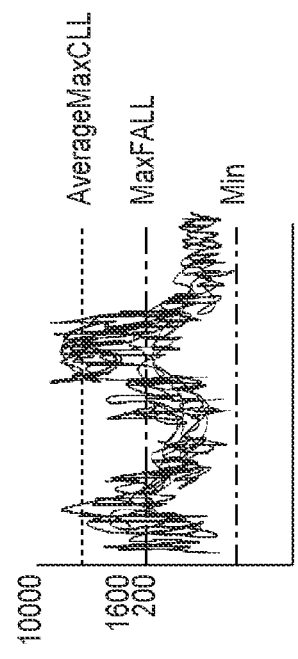
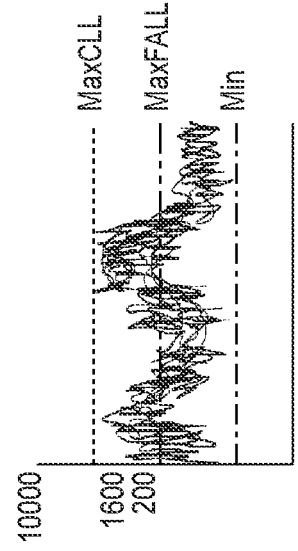
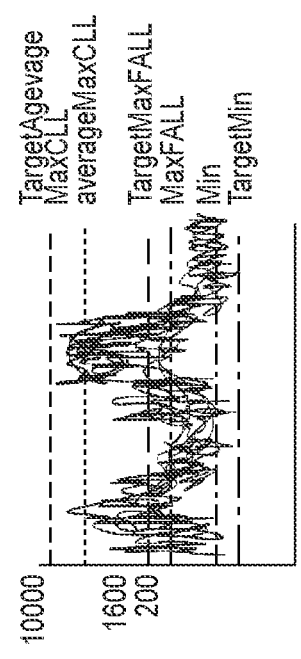
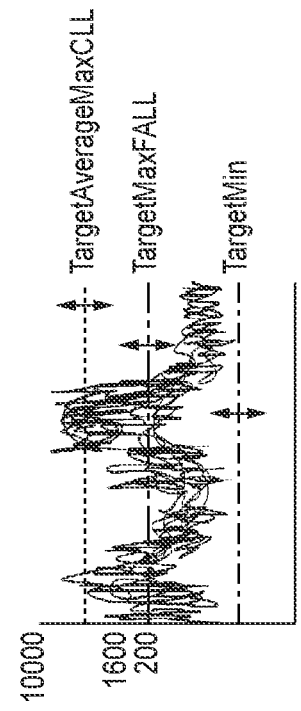
FIG. 3A
FIG. 3B
FIG. 3C
FIG. 3D
FIG. 3E
FIG. 3F

IMAGE PROCESSING APPARATUS AND IMAGE PROCESSING METHOD

BACKGROUND OF THE INVENTION

Field of the Invention

The present invention relates to an image processing technique for displaying a luminance range of a shot image.

Description of the Related Art

There are display apparatuses capable of displaying images with a dynamic range (High Dynamic Range, HDR) that is wider than a dynamic range (Standard Dynamic Range, SDR) that can be displayed by conventional display apparatuses. There are image capture apparatuses such as digital video cameras capable of outputting an HDR compliant image signal in order to display an image on such a display apparatus. In addition, some conventional image capture apparatuses have a WFM function that displays a waveform monitor (WFM: waveform monitor) indicating a frequency distribution of luminance values of a shot image, and a user can perform an exposure adjustment while viewing a WFM image.

HDR-related standardization is also progressing, and additional information such as, for example, MaxCLL (Maximum Content Light Level), indicating a maximum luminance value for each frame or scene, and MaxFALL (Maximum Frame Average Light Level), indicating a mean value of the maximum luminance value for each frame, is defined in HDR10+ or the like. MaxCLL and MaxFALL can be inserted as additional information of a storage image or can be transmitted between devices according to the HDMI standard or the like, and by outputting the information from the image capture apparatus to the display apparatus, the user can easily adjust the luminance of the display apparatus.

Although image capture apparatuses have a small display unit for displaying a shot image, since a wider luminance range can be expressed with HDR than SDR, it is difficult to confirm the HDR luminance range with a small display unit. Therefore, there is an increasing need for technologies by which it is possible to easily confirm the luminance range of a shot image by a WFM image.

Japanese Patent No. 5538973 describes a technique in which a knee point of a tone mapping curve is displayed on a WFM image so that a user can intuitively grasp the level of the knee point.

However, in Japanese Patent No. 5538973, although it is possible to confirm the relationship between the WFM image and the knee point, it is impossible to confirm the relationship between the maximum luminance value, the minimum luminance value, and the average luminance value.

SUMMARY OF THE INVENTION

The present invention has been made in consideration of the aforementioned problems, and realizes a technique which a user can easily confirm a relationship between frequency distributions and maximum values, minimum values, and average values obtained from pixel values of images during shooting.

In order to solve the aforementioned problems, the present invention provides an image processing apparatus comprising: a memory and at least one processor and/or at least one circuit which function as: an input unit configured to input an image; a detection unit configured to detect a pixel value of each pixel of an input image and obtain at least one of a maximum value, a minimum value, and an average value of pixel values for each of predetermined sections of the input image; a first image generation unit configured to generate a first image indicating a frequency of pixel values of the input image, where a position of a pixel and a pixel value are associated; a second image generation unit configured to generate a second image in which additional information including at least one of the maximum value, the minimum value, and the average value is superimposed on the first image; and a display unit configured to superimpose the second image on the input image and display the result.

In order to solve the aforementioned problems, the present invention provides a system which includes a first image capture apparatus and a second image capture apparatus, and synchronizes a capturing operation in the first image capture apparatus and a capturing operation in the second image capture apparatus by a synchronization signal outputted from the first image capture apparatus, wherein the first image capture apparatus has a memory and at least one processor and/or at least one circuit which function as: a detection unit configured to detect a pixel value of each pixel of a shot image and obtain at least one of a maximum value, a minimum value, and an average value of pixel values for each of predetermined sections of the shot image; a first image generation unit configured to generate a first image indicating a frequency of pixel values of the shot image, where a position of a pixel and a pixel value are associated; a second image generation unit configured to generate a second image in which additional information including at least one of the maximum value, the minimum value, and the average value is superimposed on the first image; and a display unit configured to display the second image superimposed on the shot image of the first image capture apparatus; an output unit configured to output a synchronization signal to the second image capture apparatus, wherein the second image capture apparatus has a memory and at least one processor and/or at least one circuit which function as: an input unit configured to input a synchronization signal outputted from the first image capture apparatus; a detection unit configured to detect a pixel value of each pixel of a shot image of the second image capture apparatus and obtain at least one of a maximum value, a minimum value, and an average value of pixel values for each of predetermined sections of the shot image; a third image generation unit configured to generate a third image indicating a frequency of pixel values of the shot image, where a position of a pixel and a pixel value are associated; a fourth image generation unit configured to generate a fourth image in which additional information including at least one of the maximum value, the minimum value, and the average value is superimposed on the third image; and an output unit configured to output to the first image capture apparatus a response signal into which the additional information is inserted in response to the synchronization signal, wherein the processor and/or the circuit of the first image capture apparatus further function as: an extraction unit configured to extract additional information included in the response signal outputted by the output unit of the second image capture apparatus, a generation unit configured to generate a fifth image in which the additional information is superimposed on at least one of the first image and the second image, and a display unit configured to superimpose the fifth image on the shot image and display the result.

In order to solve the aforementioned problems, the present invention provides an image capture apparatus comprising: a memory and at least one processor and/or at least one circuit which function as: an output unit configured to output a synchronization signal for synchronizing an image capturing operation with another image capture apparatus; a detection unit configured to detect a pixel value of each pixel of a shot image and obtain at least one of a maximum value, a minimum value, and an average value of pixel values for each of predetermined sections of the shot image; a first image generation unit configured to generate a first image indicating a frequency of pixel values of the shot image, where a position of a pixel and a pixel value are associated; a second image generation unit configured to generate a second image in which additional information including at least one of the maximum value, the minimum value, and the average value is superimposed on the first image; a display unit configured to superimpose the second image on the shot image and display the result; an extraction unit configured to extract additional information detected from a shot image of the other image capture apparatus included in a response signal outputted by the other image capture apparatus with respect to a synchronization signal outputted to the other image capture apparatus; and a generation unit configured to generate a third image in which the additional information is superimposed on at least one of the first image and the second image, wherein a pixel value of each pixel of a shot image of the other image capture apparatus is detected and the additional information includes at least one of a maximum value, a minimum value, and an average value of pixel values for each of predetermined sections of the shot image.

In order to solve the aforementioned problems, the present invention provides an image capture apparatus comprising: a memory and at least one processor and/or at least one circuit which functions as: an input unit configured to input a synchronization signal for synchronizing an image capturing operation with another image capture apparatus; a detection unit configured to detect a pixel value of each pixel of a shot image and obtain at least one of a maximum value, a minimum value, and an average value of pixel values for each of predetermined sections of the shot image; a first image generation unit configured to generate a first image indicating a frequency of pixel values of the shot image, where a position of a pixel and a pixel value are associated; a second image generation unit configured to generate a second image in which additional information including at least one of the maximum value, the minimum value, and the average value is superimposed on the first image; and an output unit configured to output to the other image capture apparatus a response signal into which the additional information is inserted.

In order to solve the aforementioned problems, the present invention provides an image processing method comprising: inputting an image; detecting a pixel value of each pixel of an input image and obtaining at least one of a maximum value, a minimum value, and an average value of pixel values for each of predetermined sections of the input image; generating a first image indicating a frequency of pixel values of the input image, where a position of a pixel and a pixel value are associated; generating a second image in which additional information including at least one of the maximum value, the minimum value, and the average value is superimposed on the first image; and superimposing the second image on the input image and displaying the result.

In order to solve the aforementioned problems, the present invention provides a method of controlling an image capture apparatus which detects a pixel value of each pixel of a shot image and obtain at least one of a maximum value, a minimum value, and an average value of pixel values for each of predetermined sections of the shot image; generates a first image indicating a frequency of pixel values of the shot image, where a position of a pixel and a pixel value are associated; generates a second image in which additional information including at least one of the maximum value, the minimum value, and the average value is superimposed on the first image; and superimposes the second image on the shot image and display the result, the method comprising: outputting a synchronization signal for synchronizing an image capturing operation with another image capture apparatus; extracting additional information detected from a shot image of the other image capture apparatus included in a response signal outputted by the other image capture apparatus with respect to a synchronization signal outputted to the other image capture apparatus; and generating a third image in which the additional information is superimposed on at least one of the first image and the second image, wherein a pixel value of each pixel of a shot image of the other image capture apparatus is detected and the additional information includes at least one of a maximum value, a minimum value, and an average value of pixel values for each of predetermined sections of the shot image.

In order to solve the aforementioned problems, the present invention provides a method of controlling an image capture apparatus which detects a pixel value of each pixel of a shot image and obtain at least one of a maximum value, a minimum value, and an average value of pixel values for each of predetermined sections of the shot image; generates a first image indicating a frequency of pixel values of the shot image, where a position of a pixel and a pixel value are associated; and generates a second image in which additional information including at least one of the maximum value, the minimum value, and the average value is superimposed on the first image, the method comprising: inputting a synchronization signal for synchronizing an image capturing operation with another image capture apparatus; and outputting to the other image capture apparatus a response signal into which the additional information is inserted.

In order to solve the aforementioned problems, the present invention provides a non-transitory computer-readable storage medium storing a program for causing a computer to execute an image processing method comprising: inputting an image; detecting a pixel value of each pixel of an input image and obtaining at least one of a maximum value, a minimum value, and an average value of pixel values for each of predetermined sections of the input image; generating a first image indicating a frequency of pixel values of the input image, where a position of a pixel and a pixel value are associated; generating a second image in which additional information including at least one of the maximum value, the minimum value, and the average value is superimposed on the first image; and superimposing the second image on the input image and displaying the result.

In order to solve the aforementioned problems, the present invention provides a non-transitory computer-readable storage medium storing a program for causing a computer to execute a method of controlling an image capture apparatus which detects a pixel value of each pixel of a shot image and obtain at least one of a maximum value, a minimum value, and an average value of pixel values for each of predetermined sections of the shot image; generates a first image indicating a frequency of pixel values of the shot image, where a position of a pixel and a pixel value are associated; generates a second image in which additional information including at least one of the maximum value, the minimum value, and the average value is superimposed on the first image; and superimposes the second image on the shot image and display the result, the method comprising: outputting a synchronization signal for synchronizing an image capturing operation with another image capture apparatus; extracting additional information detected from a shot image of the other image capture apparatus included in a response signal outputted by the other image capture apparatus with respect to a synchronization signal outputted to the other image capture apparatus; and generating a third image in which the additional information is superimposed on at least one of the first image and the second image, wherein a pixel value of each pixel of a shot image of the other image capture apparatus is detected and the additional information includes at least one of a maximum value, a minimum value, and an average value of pixel values for each of predetermined sections of the shot image.

In order to solve the aforementioned problems, the present invention provides a non-transitory computer-readable storage medium storing a program for causing a computer to execute a method of controlling an image capture apparatus which detects a pixel value of each pixel of a shot image and obtain at least one of a maximum value, a minimum value, and an average value of pixel values for each of predetermined sections of the shot image; generates a first image indicating a frequency of pixel values of the shot image, where a position of a pixel and a pixel value are associated; and generates a second image in which additional information including at least one of the maximum value, the minimum value, and the average value is superimposed on the first image, the method comprising: inputting a synchronization signal for synchronizing an image capturing operation with another image capture apparatus; and outputting to the other image capture apparatus a response signal into which the additional information is inserted.

According to the present invention, the user can easily confirm a relationship between frequency distributions and maximum values, minimum values, and average values obtained from pixel values of images during shooting.

Further features of the present invention will become apparent from the following description of exemplary embodiments (with reference to the attached drawings).

BRIEF DESCRIPTION OF THE DRAWINGS

FIG. 1C is a block diagram illustrating an apparatus configuration of a third embodiment.

FIG. 2B is a flowchart illustrating shooting processing of the second embodiment.

FIGS. 3A to 3J are views illustrating WFM images and additional information of the first to fourth embodiments.

DESCRIPTION OF THE EMBODIMENTS

Figure 1A:
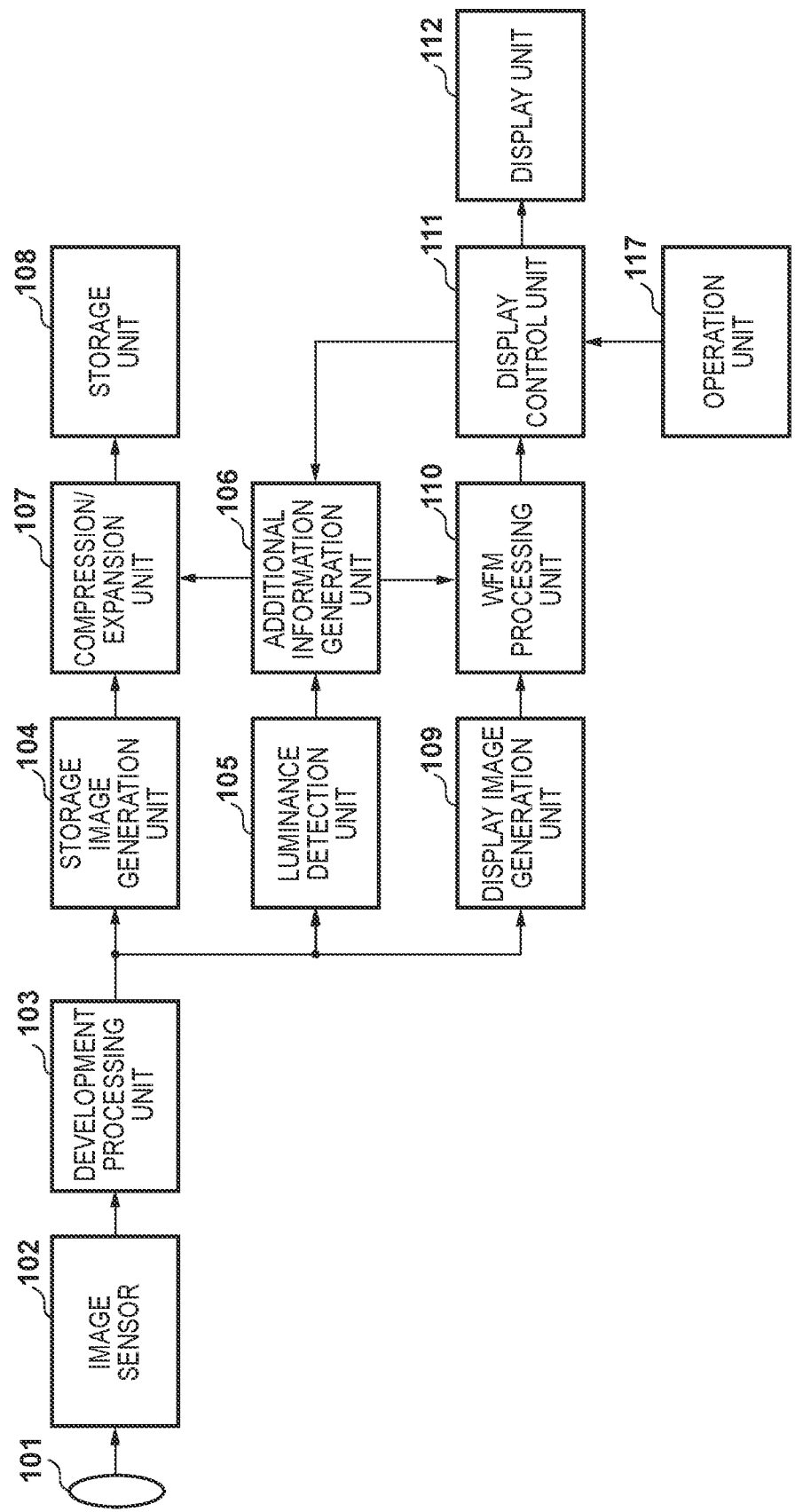
FIG. 1A is a block diagram illustrating an apparatus configuration of a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Hereinafter, as an image processing apparatus of the present embodiment, an example of an image capture apparatus such as a digital video camera that has a WFM function capable of generating a WFM image from an HDR image that complies with HDR10+ will be described. The WFM function can express a distribution of pixel values such as luminance components and color difference components of an image with positions of pixels of a shot image as a horizontal axis and a signal level for each pixel as a vertical axis.

First Embodiment

The first embodiment describes a configuration in which a user of an image capture apparatus 100 performs shooting while confirming on a WFM image luminance values (a maximum luminance value MaxCLL, an average luminance value MaxFALL, a minimum luminance value Min, and an average value MaxCLL of the maximum luminance value) and target luminance values (TargetMaxCLL, TargetMaxFALL, and TargetMin) of an image being shot.

<Apparatus Configuration>

First, referring to FIG. 1A, a configuration and a function of the image capture apparatus 100 according to the first embodiment will be described.

An optical system 101 includes a focus lens, a zoom lens, a diaphragm, a shutter, and the like, and adjusts an incident light amount and an in-focus condition of a subject image to form an image on an image sensor 102.

The image sensor 102 includes a photoelectric conversion element such as a CCD or a CMOS, photoelectrically converts a subject image formed by the optical system 101 to generate an analog image signal, further converts the analog image signal into a digital signal, and outputs the digital signal. Respective pixels of the image sensor have a mosaic structure in which R (red), G (green), and B (blue) color filters is arranged in a predetermined arrangement, for example, one red pixel, one blue pixel, and two green pixels are regularly arranged as one set every four pixels. Such a pixel arrangement is referred to as a Bayer array. The digital image signal outputted from the image sensor 102 is outputted to a development processing unit 103 as a Bayer image signal.

The development processing unit 103 inputs the Bayer image signal from the image sensor 102 and converts it into an RGB image signal for each pixel. Next, the development processing unit 103 generates an RGB image signal resulting from white balance (WB) adjustment by RGB offset adjustment and gain adjustment and gamma correction processing. Furthermore, the development processing unit 103 converts the RGB image signal after the gamma correction into a luminance signal (Y) and color difference signals (Cb, Cr), and outputs the luminance signal and the color difference signals to a storage image generation unit 104. Gamma correction is a process using characteristics for generating a storage image desired by a user in consideration of the characteristics of the image sensor 102, the optical system 101, and the like. By changing the gamma correction value, it is possible to generate a storage image in which the texture and gradation of a movie film are reproduced, or it is possible to generate a storage image for display on a TV monitor. By changing the gamma correction value, an allocation range of the luminance signal (Y) and the color difference signals (Cb, Cr) to the RGB image signal is changed. At a time of HDR shooting, it is possible to change the characteristics of the image while being conscious of an HDR region and an SDR region.

From the luminance signal/color difference signal developed by the development processing unit 103, the storage image generation unit 104 performs image conversion processing in accordance with a storage format, such as performing resolution conversion in accordance with a storage size or performing a color gamut conversion in accordance with a storage color gamut.

A luminance detection unit 105 extracts luminance values for each pixel from the luminance signal/color difference signal, compares/averages the luminance values of the respective pixels of the shot image (input image), and calculates MaxCLL (maximum value) of luminance values of the image in predetermined sections, MaxFALL (an average value of the maximum values), and Min (a minimum value). Note, the predetermined sections can be arbitrarily set by the user, for example, for each frame or for each scene including a plurality of frames.

An additional information generation unit 106 generates meta-data for the storage image or an additional image and a WFM image to be superimposed from MaxCLL, MaxFALL, and Min calculated by the luminance detection unit 105. The generated meta-data in which SEI (Supplemental Enhancement Information), a VUI (Video Usability Information), or the like can be inserted in HEVC.

A compression/expansion unit 107 performs a process of compressing and encoding an H.264 or HEVC image signal or the like and storing the image signal in a storage unit 108, and a process of reading out an image file encoded from the storage unit 108 and decoding the image signal. The storage unit 108 is a memory card, a hard disk, or the like.

A display image generation unit 109 generates an image signal for display on which resolution conversion, color gamut conversion, gamma processing, and the like are performed in accordance with the setting of the resolution, frame rate, and the like of a display unit 112.

A WFM processing unit 110 analyzes the image signal for display inputted from the display image generation unit 109, and generates a WFM image in which pixel positions and pixel values of the image signal are associated with each other. The WFM processing unit 110 generates, for example, a WFM image as illustrated in FIG. 3A. Then, the WFM processing unit 110 performs processing in which the WFM image is superimposed on the shot image. In the present embodiment, the WFM processing unit 110 extracts a luminance component from the shot image, converts the extracted luminance component into units of luminance values such as $cd/m^2$ or $lm/m^2$ or nits, and integrates the luminance information to generate a WFM image indicating a frequency distribution of luminance values. The WFM image is configured such that the horizontal axis represents the position of pixels in the horizontal direction of the image, and the vertical axis represents the luminance value for each pixel position. The WFM image and the shot image are superimposed as illustrated in FIGS. 4A to 4D or are arranged close to each other as illustrated in FIG. 4E and are outputted to a display control unit 111 as a display image.

The display control unit 111 generates a synchronization signal for outputting the display image inputted from the WFM processing unit 110 to the display unit 112, and outputs the synchronization signal to the display unit 112. The synchronization signal includes an image horizontal direction synchronization signal, an image vertical direction synchronization signal, an effective image position synchronization signal, and the like. Also, in a case where the display unit 112 includes a touch panel, the display control unit 111 feeds back the setting value set by the user operating the touch panel to the additional information generation unit 106. In the present embodiment, target values Target such as MaxFALL, AverageMaxCLL, and Min can be set by the user on the WFM image, and the additional information generation unit 106 generates an additional image in which the target luminance values for additionally displaying the set target luminance values on the WFM image are indicated by lines parallel to the horizontal axis.

The display unit 112 displays image data output from the display control unit 111. The display unit 112 is, for example, a liquid crystal panel or an organic EL panel.

An operation unit 117 includes an operation member for receiving user operations, for example, a keyboard, a mouse, a touch panel, or the like. In a case where a touch panel is mounted, the touch panel is formed integrally with the display unit 112, and an operation can be inputted by touching the display surface.

Note, among the functional blocks described above, the development processing unit 103, the storage image generation unit 104, the luminance detection unit 105, the additional information generation unit 106, the compression/expansion unit 107, the display image generation unit 109, the WFM processing unit 110, and the display control unit 111 may be configured by a dedicated circuit module or a microprocessor for performing processing of the functional blocks. In addition, a CPU (not shown) that controls the entire image capture apparatus 100 may execute a program stored in a memory by executing processing of each functional block.

<Shooting Processing>

Next, with reference to FIG. 2A, shooting processing of the image capture apparatus 100 of the present embodiment will be described.

Figure 2A:
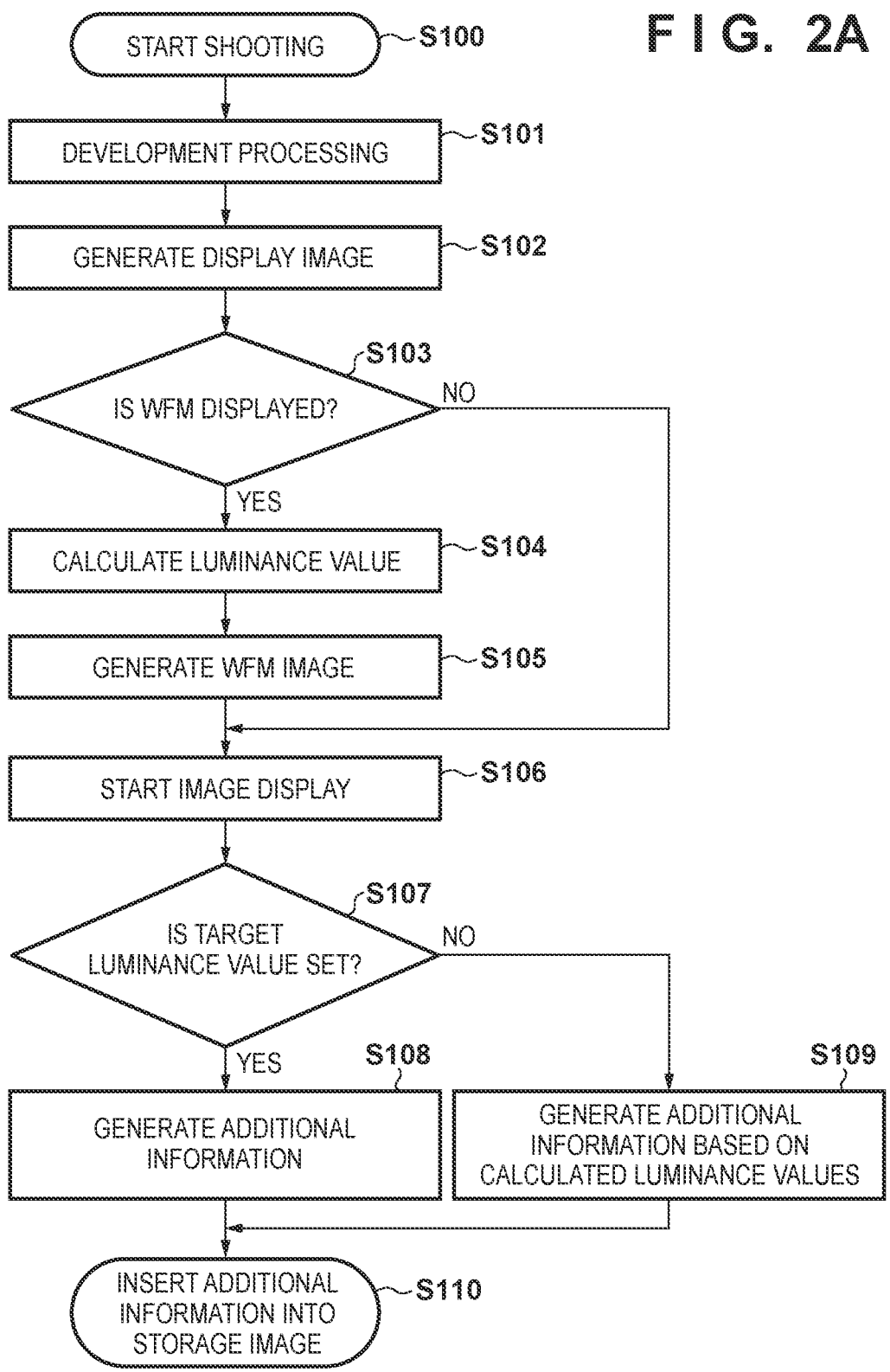
FIG. 2A is a flowchart illustrating shooting processing of the first embodiment.

Note that the processing of FIG. 2A is realized by a CPU (not shown) that controls the entire image capture apparatus 100 executing a program stored in memory and controlling respective functional blocks of the image capture apparatus 100.

In step S100, the image sensor 102 starts an image capturing operation.

In step S101, the development processing unit 103 performs development processing on the image signals captured in step S100.

In step S102, the display image generation unit 109 generates a display image signal from the image signal developed in step S101. The display image generation unit 109 performs conversion to a display resolution and adjusts the data amount (bit width) of the luminance values and the color difference values. Characters and graphics for assisting shooting are also generated in this step.

In step S103, the display control unit 111 determines whether a setting has be made to display the WFM image by a user operation, and in a case where a setting has been made to display the WFM image, the processing advances to step S106 through the processing of step S104 to step S105, and in a case where the setting has not been made, processing advances to step S106 skipping the processing of step S104 to step S105.

In step S104, the luminance detection unit 105 extracts luminance values from the image signal developed in step S101, and calculates MaxCLL, MaxFALL, AverageMaxCLL, and Min.

In step S105, the WFM processing unit 110 generates the WFM image as illustrated in FIGS. 3A-3D. FIG. 3A illustrates a basic WFM image on which no additional image is superimposed. FIG. 3B illustrates a WFM image on which additional images of MaxCLL and MaxFALL are superimposed. FIG. 3C illustrates an exemplary display in which an additional image of Min is superimposed on the WFM image of FIG. 3B. FIG. 3D illustrates a WFM image in which MaxCLL of FIG. 3C is replaced with AverageMaxCLL.

In a case where the WFM image is set to be displayed in step S103, the display control unit 111 starts displaying an image in which a WFM image 602 is superimposed on or arranged in the vicinity of a shot image 601 as illustrated in the FIGS. 4A-4E in step S106.

Figure 4A:
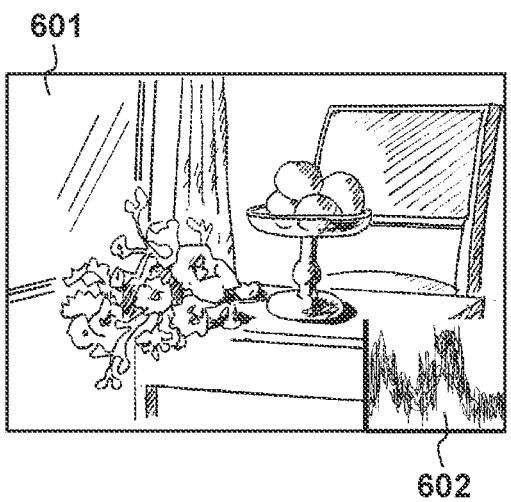
FIGS. 4A to 4E are views illustrating display examples in which WFM images are superimposed on shot images of the first to fourth embodiments.
Figure 4B:
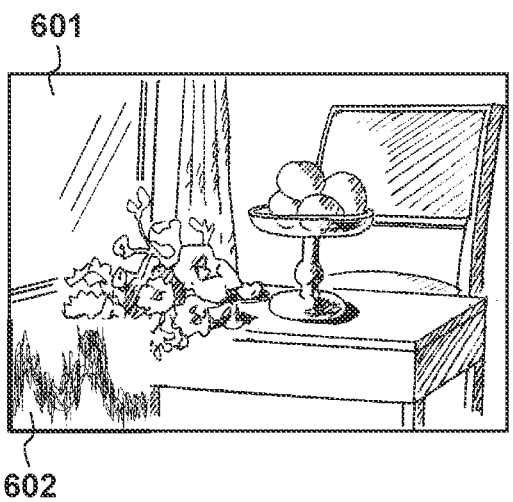
Figure 4C:
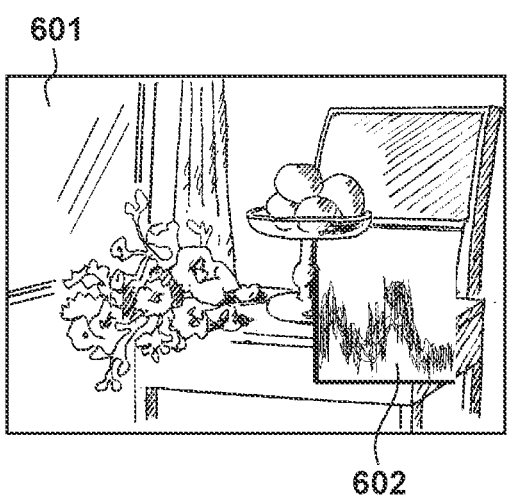
Figure 4D:
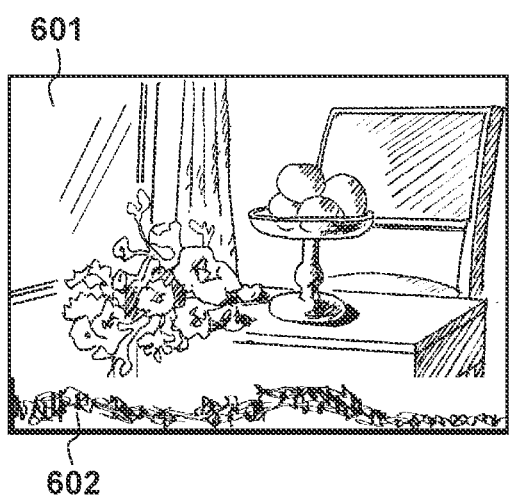

FIG. 4A illustrates an exemplary display in which the WFM image 602 is arranged at the lower right of the shot image 601. FIG. 4B illustrates an exemplary display in which the WFM image 602 is arranged at the lower left of the shot image 601. FIG. 4C illustrates an exemplary display in which the WFM image 602 is arranged toward the right of center of the shot image 601. FIG. 4D illustrates an exemplary display in which the WFM image 602 is arranged at the lower edge of the shot image 601. FIG. 4E illustrates an exemplary display in which the shot image 601 and the WFM image 602 are arranged separated from each other without superimposition.

In a case where the WFM image is not set to be displayed in step S103, the display image generation unit 109 generates a display image on which the WFM image and the additional image are not superimposed, and the display control unit 111 starts displaying the image in step S106.

In step S107, the display control unit 111 determines whether a setting by a user operation has been made for a target luminance value for the time of shooting, and in a case where a target luminance value has been set, processing advances to step S108, and in a case where it has not been set, processing advances to step S109.

In step S108, the user sets a target luminance value (such as TargetMaxFALL, TargetAverageMaxCLL, and TargetMin) by the operation unit 117 while watching the WFM image as illustrated in FIG. 3E. The additional information generation unit 106 converts the target luminance value specified by the user into additional information of the storage image.

In step S110, the storage image generation unit 104 generates a storage image signal from the image signal resulting from the development processing in the development processing unit 103. The compression/expansion unit 107 compresses and encodes the storage image signal into a predetermined format and generates an image file, adds the additional information generated in step S108 to the image file as meta-data, and stores the image file in the storage unit 108. FIG. 3E illustrates a WFM image when the user designates target luminance values (such as TargetMaxFALL, TargetAverageMaxCLL and TargetMin). The user can set the additional image indicating the target luminance values by moving the target luminance values up and down using the operation unit 117. The target luminance values to be set may be at least one of TargetMaxFALL, TargetAverageMaxCLL, or TargetMin. When a plurality of target luminance values are set, each value may be represented by a line having a different color or shape. Although the displayed image will be somewhat complicated, the set target luminance values and the actual luminance values may be displayed simultaneously as illustrated in FIG. 3F. FIG. 3F illustrates a WFM image in which the luminance values of FIG. 3D and the target luminance values of FIG. 3E are displayed.

In step S109, the additional information generation unit 106 converts MaxCLL, MaxFALL, Min, and the like calculated in step S104 into additional information of the storage image.

In step S110, the storage image generation unit 104 generates a storage image signal from the image signal resulting from the development processing in the development processing unit 103. In addition, the compression/expansion unit 107 compresses and encodes the storage image signal into a predetermined format and generates an image file, adds MaxCLL, MaxFALL, Min and the like calculated in step S104 to the image file as additional information, and stores the image file in the storage unit 108. In this instance, the additional information is a WFM image as illustrated in the FIGS. 3A-3C.

By the above-described process, the user can easily confirm a relationship between the frequency distributions (WFMs) of the luminance values of the images being shot and the maximum value, minimum value, and average value (MaxCLL, MaxFALL, Min).

Second Embodiment

Next, a description will be given of a second embodiment.

The second embodiment describes a configuration in which the image capture apparatus 100 and a display apparatus 200 are connected by an interface cable such as an HDMI® cable, and a user performs shooting while confirming MaxCLL, MaxFALL, AverageMaxCLL, Min, and target luminance values by the display apparatus 200 using a WFM image.

<Apparatus Configuration>

Figure 1B:
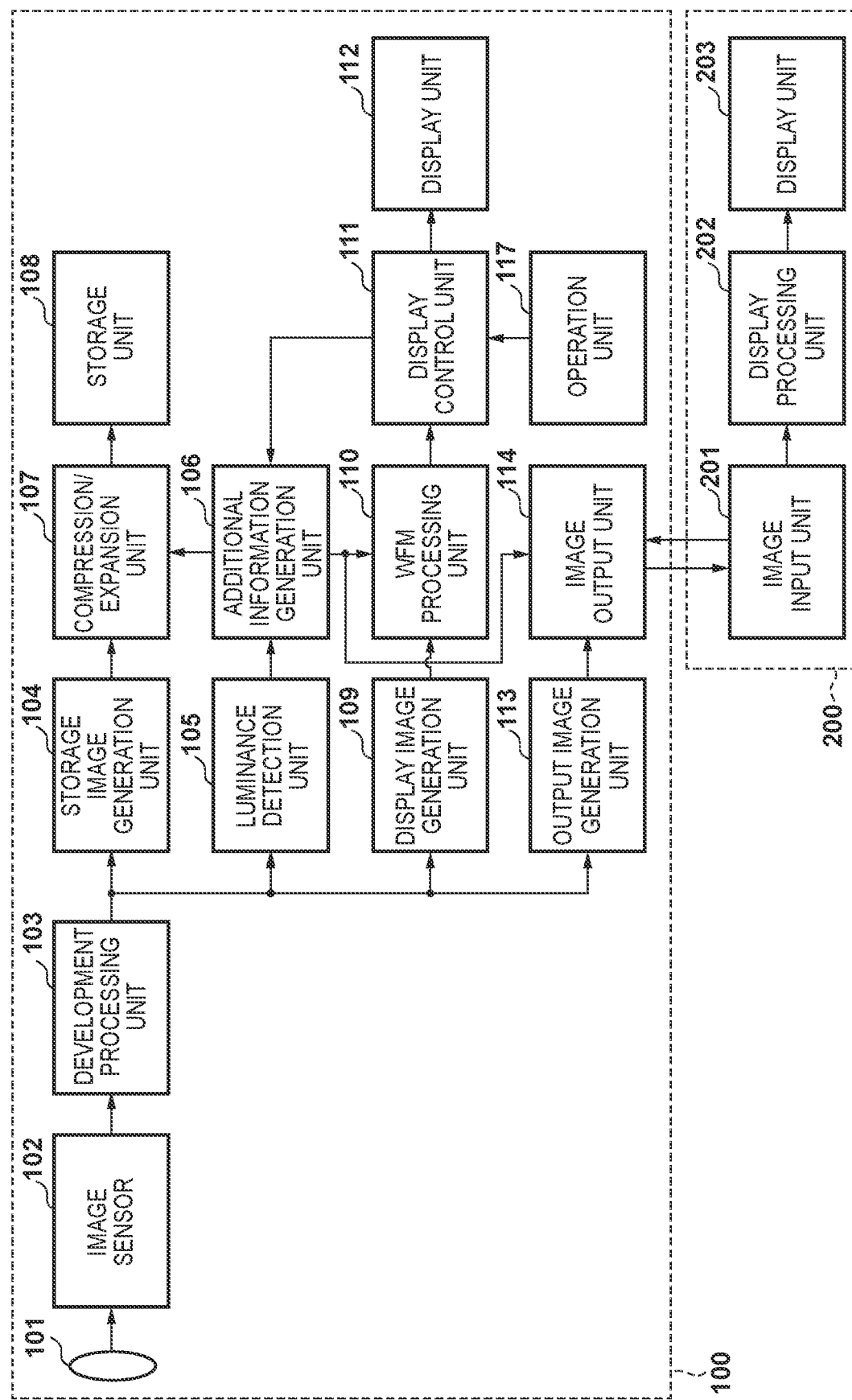
FIG. 1B is a block diagram illustrating an apparatus configuration of a second embodiment.

First, referring to FIG. 1B, the configurations and functions of the image capture apparatus 100 and the display apparatus 200 of the second embodiment will be described focusing on portions different from those in FIG. 1A.

An output image generation unit 113 generates an image signal to be output from the image capture apparatus 100 to the display apparatus 200. The output image generation unit 113 performs resolution or color gamut conversion processing and the like on the image signal in accordance with the resolution and the frame rate that can be received by the display apparatus 200. The image signal outputted to the display apparatus 200 is, for example, an image signal complying with HDMI.

An image output unit 114 transmits the image signal generated by the output image generation unit 113 to an external device such as the display apparatus 200. For example, the image output unit 114 converts the image signal generated by the output image generation unit 113 into a TMDS signal or the like complying with HDMI, and outputs the converted signal.

The display apparatus 200 includes an image input unit 201, a display processing unit 202, and a display unit 203.

The image input unit 201 receives the TMDS signal output from the image output unit 114, and outputs the received signal to the display processing unit 202.

The display processing unit 202 adjusts the gain, gamma, and the like of the image signal in accordance with the display characteristics of the display unit 203, generates a display image signal, and outputs the display image signal to the display unit 203.

The display unit 203 is, for example, a liquid crystal display module such as a TV monitor or an organic EL display module.

<Shooting Processing>

Next, with reference to FIG. 2B, shooting processing of the image capture apparatus 100 of the second embodiment will be described.

The processing of step S200 to step S206 is the same as in step S100 to step S106 of FIG. 2A.

In step S207, the display control unit 111 determines whether a setting by a user operation has been made for a target luminance value for the time of shooting, and in a case where a target luminance value has been set, processing advances to step S208, and in a case where it has not been set, processing advances to step S209.

In step S208, the user sets the target luminance values using the operation unit 117 while viewing the WFM image as illustrated in FIG. 3E. The additional information generation unit 106 converts the target luminance value specified by the user into additional information of an output image.

In step S210, the output image generation unit 113 generates an output image signal from the image signal resulting from the development processing in the development processing unit 103. In addition, the image output unit 114 inserts the additional information generated in step S208 into the output image signal (TMDS signal) and outputs the additional information. In this case, the WFM image generated in step S205 may be superimposed on the output image signal and outputted.

In step S209, the output image generation unit 113 generates an output image signal from the image signal resulting from the development processing in the development processing unit 103. Also, the image output unit 114 inserts MaxCLL, MaxFALL, Min, and the like calculated in step S204 into the output image signal as additional information and outputs the additional information. In this instance, the additional information is a WFM image as illustrated in the FIGS. 3A-3C.

By the above-described process, the user can easily confirm a relationship between the frequency distributions (WFMs) of the luminance values of the images being shot and the maximum value, minimum value, and average value (MaxCLL, MaxFALL, Min).

Third Embodiment

Next, a description will be given of a third embodiment.

In the third embodiment, a configuration in which the image capture apparatus 100 automatically adjusts the exposure based on the target luminance values set by the user on the WFM image will be described.

<Apparatus Configuration>

First, referring to FIG. 1C, the configurations and functions of the image capture apparatus 100 of the third embodiment will be described focusing on portions different from those in FIG. 1A and FIG. 1B.

An exposure control unit 115 controls the diaphragm, shutter speed, ISO sensitivity, and the like of the image capture apparatus 100.

A camera operation unit 116 accepts an operation in which the user adjusts the luminance value of the shot image based on the aperture, shutter speed, ISO sensitivity, WFM image, and the like displayed on the display unit 112.

<Shooting Processing>

Figure 2C:
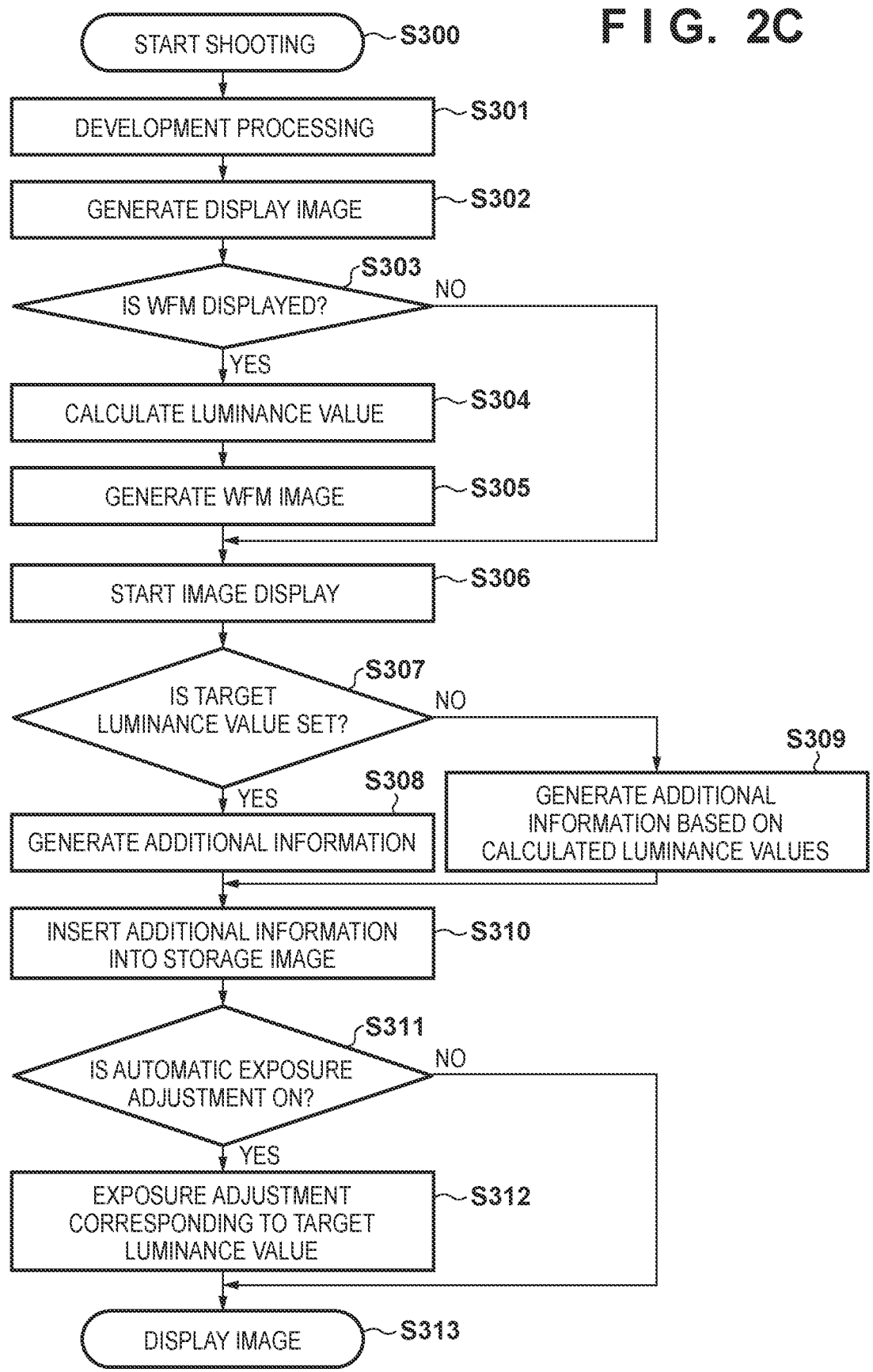
FIG. 2C is a flowchart illustrating shooting processing of the third embodiment.

Next, with reference to FIG. 2C, shooting processing of the image capture apparatus 100 of the third embodiment will be described.

The processing of step S300 to step S310 is the same as in step S100 to step S109 of FIG. 2A.

In step S311, the exposure control unit 115 determines whether the automatic exposure adjustment function of the image capture apparatus 100 is set to ON or OFF, and the processing advances to step S312 in a case where the automatic exposure adjustment function is set to ON, and advances to step S313 in a case where the automatic exposure adjustment function is set to OFF.

In step S312, the exposure control unit 115 adjusts the aperture, the shutter speed, the ISO sensitivity, and the like so that the luminance value of the shot image falls within the range of the target luminance value set in step S307. In step S311, in a case where the setting of the automatic exposure adjustment function of the image capture apparatus 100 is off, the user performs the exposure adjustment manually.

In step S313, the display control unit 111 superimposes the WFM image generated in step S305 on the image shot by automatically or manually adjusting the exposure, and displays the image on the display unit 112.

By the above-described processing, the user can perform shooting within a target luminance value range while confirming the relationship between the frequency distribution (WFM) of the luminance values of the image being shot, the maximum value, the minimum value, and the average value.

Fourth Embodiment

Next, a description will be given of a fourth embodiment.

In the fourth embodiment, a configuration will be described in which, in a system including a plurality of image capture apparatuses 400, 500 to 504, a user performs shooting while confirming MaxCLL, MaxFALL, Min, and the like of the image capture apparatuses 400, and 500 to 504 by WFM images.

In the fourth embodiment, the same subject is shot by one image capture apparatus operating as a master (hereinafter, referred to as a master image capture apparatus 400) and five image capture apparatuses operating as slaves (hereinafter, referred to as slave image capture apparatuses 500 to 504), and a WFM image is displayed on the display unit 112 of the master image capture apparatus 400.

<Apparatus Configuration>

Figure 1D:
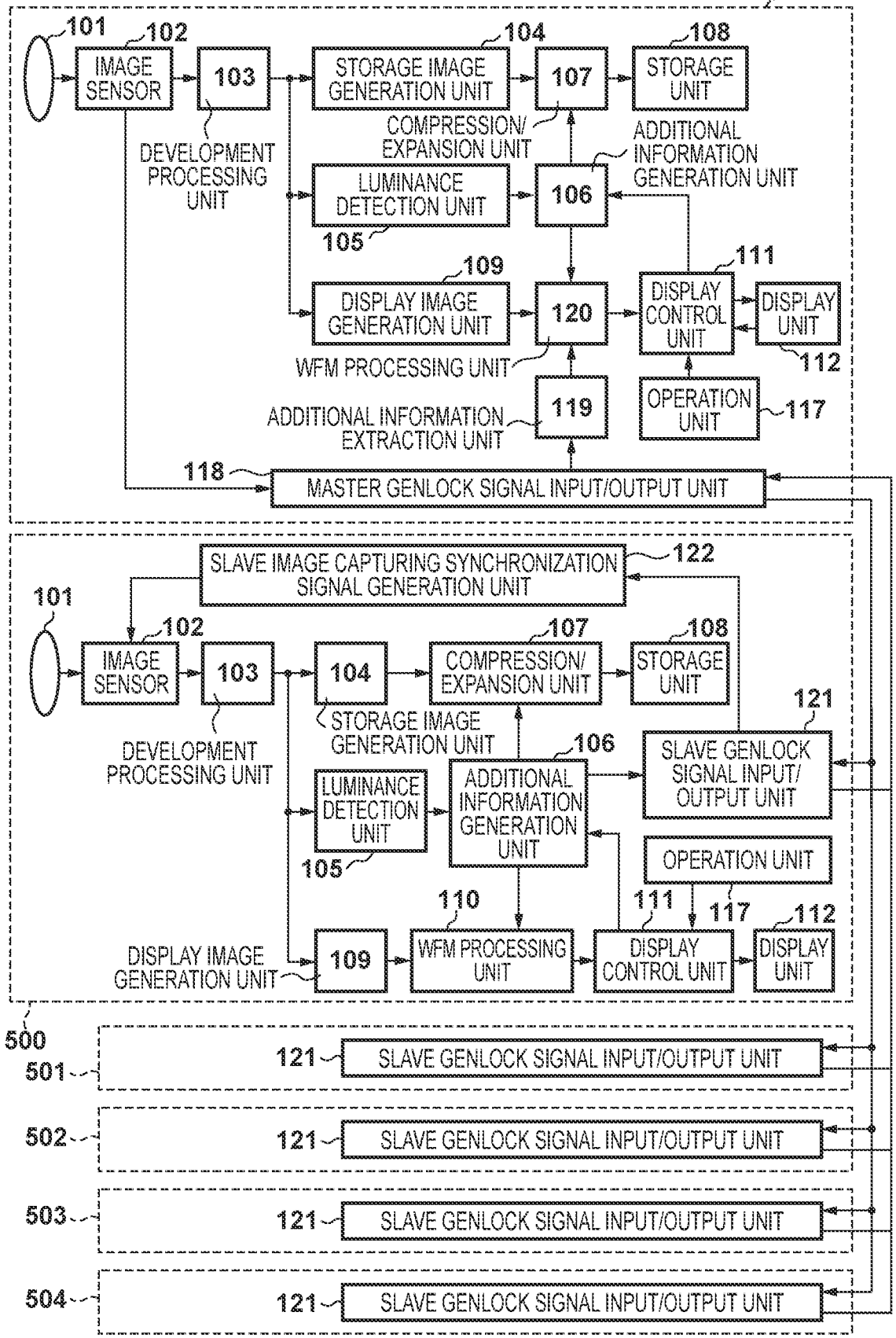
FIG. 1D is a block diagram illustrating a system configuration of the third embodiment.

First, referring to FIG. 1D, the configurations and functions of the system of the fourth embodiment will be described focusing on portions different from those in FIG. 1A.

In addition to the configuration of the image capture apparatus 100 of the first embodiment, the master image capture apparatus 400 includes a master genlock signal input/output unit 118 and an additional information extraction unit 119, and the functions of an WFM processing unit 120 are different.

The master genlock signal input/output unit 118 outputs a genlock (GENerator LOCK) signal used for driving the display unit 112 of the master image capture apparatus 400 to a slave genlock signal input/output unit 121 of the slave image capture apparatuses 500 to 504. Further, a genlock response signal is input from the slave genlock signal input/output unit 121 of the slave image capture apparatuses 500 to 504.

Here, a genlock signal is a signal used to achieve synchronization between a plurality of image capture apparatuses. In the present embodiment, the image capturing synchronization signal that the image sensor 102 uses is used as the genlock signal, but the present embodiment is not limited to this, and the synchronization signal used in each functional block of the image capture apparatus may be used as the genlock signal. The genlock signal is output by pressing a genlock signal output button (not shown) included in the master image capture apparatus 400 after the master genlock signal input/output unit 118 and the slave genlock signal input/output unit 121, which will be described later, are connected by an interface cable.

The genlock response signal is a signal including the genlock state indicating whether or not the slave image capture apparatuses 500 to 504 are synchronized by the genlock signal and the additional information described in the first to third embodiments.

The additional information extraction unit 119 extracts additional information, such as MaxCLL, MaxFALL, and Min in the slave image capture apparatuses 500 to 504, inserted in the genlock response signal outputted from the slave genlock signal input/output unit 121 of the slave image capture apparatuses 500 to 504, which will be described later.

The WFM processing unit 120 generates WFM images based on the additional information of the slave image capture apparatuses 500 to 504 extracted by the additional information extraction unit 119, in addition to the WFM images based on the additional information of the master image capture apparatus 400.

The slave image capture apparatuses 500 to 504 have a slave genlock signal input/output unit 121 and a slave image capturing synchronization signal generation unit 122 in addition to the configuration of the image capture apparatus 100 of the first embodiment.

The slave genlock signal input/output unit 121 inserts MaxCLL, MaxFALL, and Min in the slave image capture apparatuses 500 to 504 into the genlock response signal, and outputs the result to the master genlock signal input/output unit 118 of the master image capture apparatus 400.

The slave image capturing synchronization signal generation unit 122 generates an image capturing synchronization signal to be supplied to the image sensor 102 of the slave image capture apparatuses 500 to 504.

<Shooting Processing>

Next, referring to FIG. 2D and FIG. 2E, the operation of the system according to the fourth embodiment will be described.

Figure 2D:
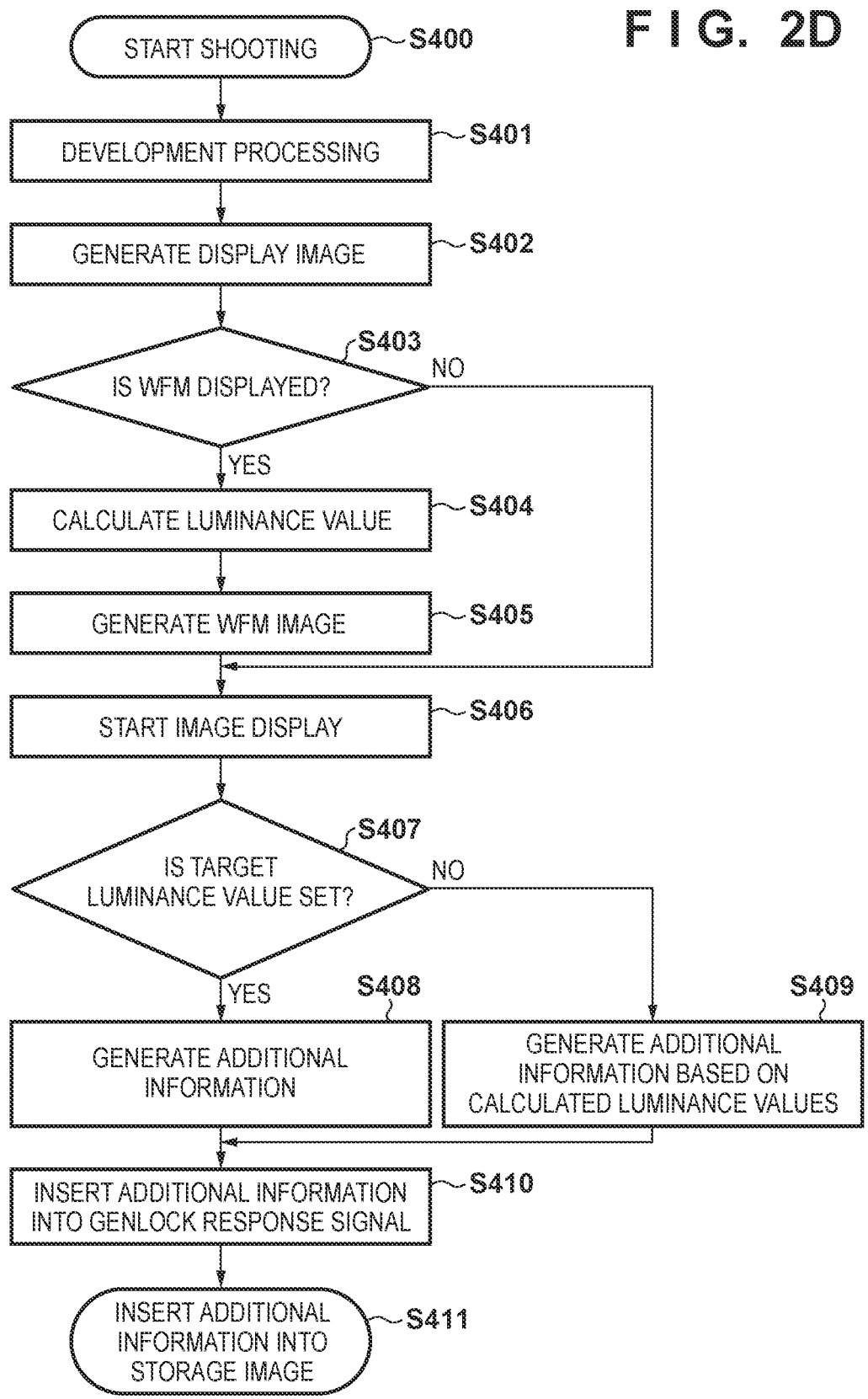
FIG. 2D is a flowchart illustrating shooting processing on a slave side of the fourth embodiment.
Figure 2E:
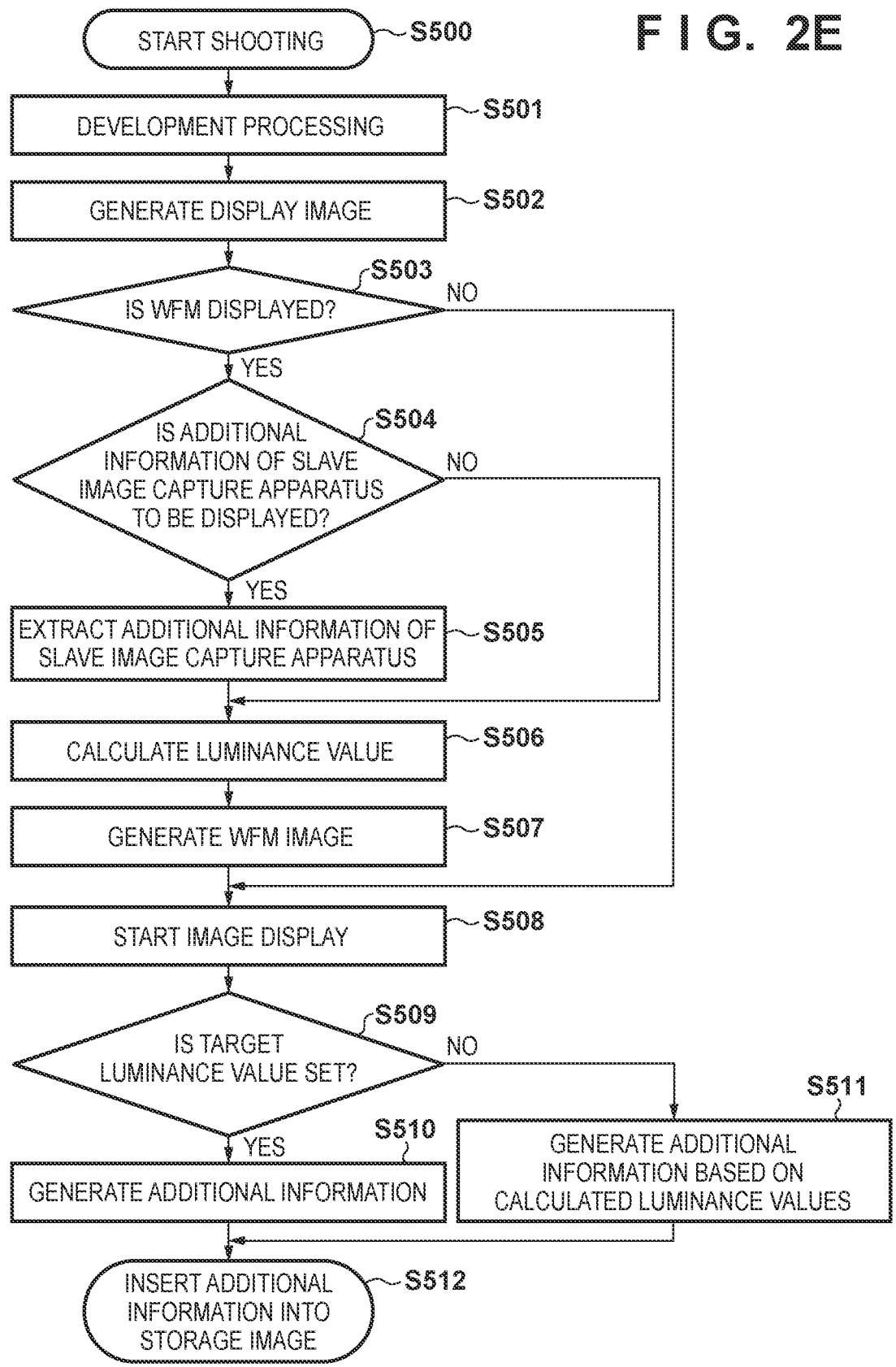
FIG. 2E is a flowchart illustrating shooting processing on a master side of the fourth embodiment.

FIG. 2D illustrates shooting processing of the slave image capture apparatuses 500 to 504, and FIG. 2E illustrates shooting processing of the master image capture apparatus 400.

First, before the start of processing, the master genlock signal input/output unit 118 of the master image capture apparatus 400 and the slave genlock signal input/output unit 121 of the slave image capture apparatuses 500 to 504 are connected so as to be able to transmit and receive a genlock signal and a genlock response signal. Then, the user presses the genlock signal output button of the master image capture apparatus 400, acquires the genlock response signals from the slave image capture apparatuses 500 to 504, and starts the processing after detecting the genlock state in the slave image capture apparatuses 500 to 504.

Processing of the slave image capture apparatuses 500 to 504 will be described with reference to FIG. 2D.

The processing of step S400 to step S409 and step S411 is the same as in step S100 to step S110 of FIG. 2A.

In step S410, the additional information generation unit 106 inserts the additional information generated in step S408 or in step S409 into the genlock response signal outputted to the master image capture apparatus 400. The slave genlock signal input/output unit 121 outputs the genlock response signal generated in step S410 to the master genlock signal input/output unit 118 of the master image capture apparatus 400.

Next, processing of the master image capture apparatus 400 will be described with reference to FIG. 2E.

Step S500 to step S503, step S506 to step S509, and step S512 are the same as step S100 to step S107, and step S110 of FIG. 2A.

In a case where the WFM image is set to be displayed in step S503, the processing advances to step S504, and in a case where it is not set, the processing advances to step S508.

In step S504, the display control unit 111 determines whether or not there is a setting for display of the additional information of the slave image capture apparatuses 500 to 504 according to a user operation, and advances the processing to step S505 in a case where the additional information of the slave image capture apparatus is set to be displayed, and advances the processing to step S506 in a case where the additional information of the slave image capture apparatus is not set.

In step S505, the additional information extraction unit 119 extracts additional information of the slave image capture apparatuses 500 to 504 from the genlock response signal which the master genlock signal input/output unit 118 received from the slave image capture apparatuses 500 to 504.

In step S506, the luminance detection unit 105 extracts luminance values from the image signal developed in step S501, and calculates MaxCLL, MaxFALL, Min, AverageMaxCLL, and AverageMin, and the like.

In step S507, the WFM processing unit 120 generates a WFM image as illustrated in FIGS. 3G-3J from the additional information of the slave image capture apparatuses 500 to 504 extracted in step S505 and MaxCLL, MaxFALL, Min, AverageMaxCLL, AverageMin, and the like calculated in step S506.

In step S504, in a case where the additional information of the slave image capture apparatuses 500 to 504 is set to be displayed, the display control unit 111 starts the display of the image acquired by superimposing the WFM image 602 on the shot image 601 as illustrated in FIGS. 4A-4E in step S508. Here, the WFM image generated in step S507 is changed according to the setting of step S504. FIGS. 3G-3J illustrate additional information to be superimposed on the WFM image changed in accordance with the setting of step S504.

Figure 3G:
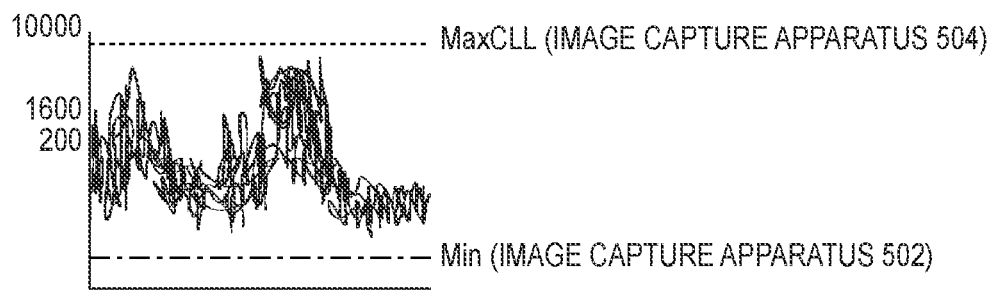
Figure 4E:
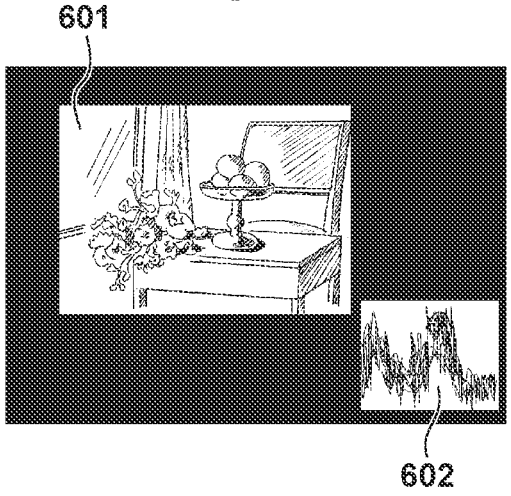

FIG. 3G illustrates an exemplary display in which the largest MaxCLL and the smallest Min from among all the image capture apparatuses are superimposed on the WFM image of the master image capture apparatus 400. By displaying in this manner, the user can confirm the maximum luminance range of all the image capture apparatuses with the master image capture apparatus 400. The present embodiment exemplifies a case where the image being captured by the slave image capture apparatus 504 is the largest MaxCLL and the image being captured by the slave image capture apparatus 502 is the smallest minimum luminance value.

Figure 3H:
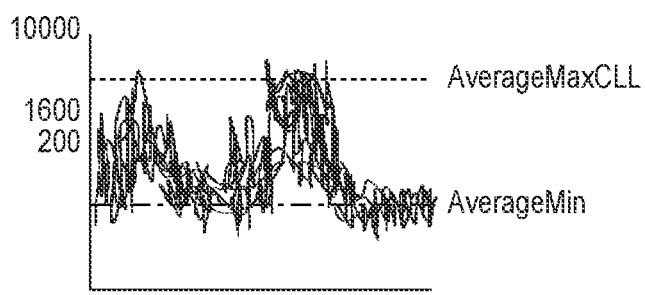

FIG. 3H illustrates an exemplary display in which the MaxCLL and AverageMin of all of the image capture apparatuses are superimposed on the WFM image of the master image capture apparatus 400. By displaying in this manner, the user can confirm the average luminance range of all the image capture apparatuses with the master image capture apparatus 400.

Figure 3I:
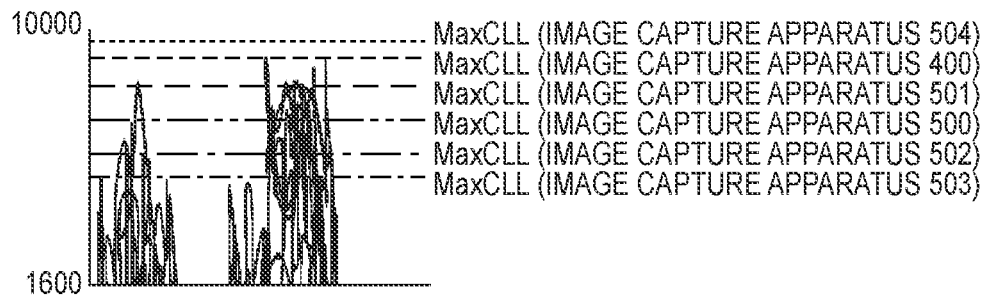

FIG. 3I illustrates an exemplary display in which the MaxCLLs of all of the image capture apparatuses are superimposed on the WFM image of the master image capture apparatus 400. By displaying in this manner, the user can confirm the MaxCLLs of all the image capture apparatuses with the master image capture apparatus 400.

Figure 3J:
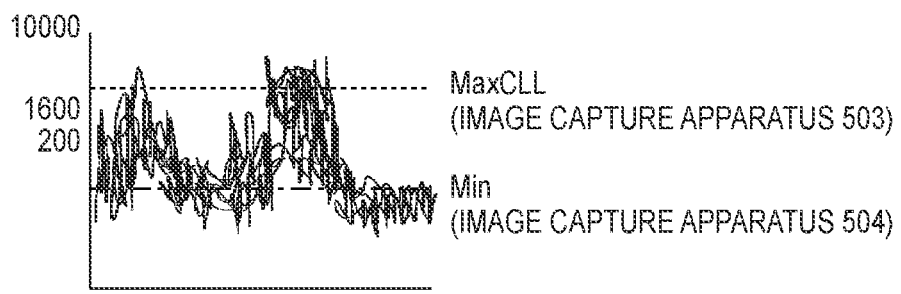

FIG. 3J illustrates an exemplary display in which the smallest MaxCLL and the largest Min from among all the image capture apparatuses are superimposed on the WFM image of the master image capture apparatus 400. By displaying in this manner, the user can confirm a common luminance range among all of the image capture apparatuses with the master image capture apparatus 400. The present embodiment exemplifies a case where the image being captured by the slave image capture apparatus 503 is the smallest MaxCLL and the image being captured by the slave image capture apparatus 504 is the largest Min.

In a case where a target luminance is set in step S509 and the additional information of the slave image capture apparatus is not set to be displayed in step S504, a WFM image on which a scale indicating the target luminance values as illustrated in FIG. 3E is superimposed on the display by the display unit 112 of the master image capture apparatus 400 in step S510. The user can set a target luminance value by moving a scale indicating the target luminance value up and down using the operation unit. Also, the additional information generation unit 106 converts the target luminance value specified by the user into additional information of the storage image.

In step S512, the storage image generation unit 104 generates a storage image signal from the image signal resulting from the development processing in the development processing unit 103. The compression/expansion unit 107 compresses and encodes the storage image signal into a predetermined format and generates an image file, adds the additional information generated in step S510 to the image file as meta-data, and stores the image file in the storage unit 108.

In a case where a target luminance is set in step S509 and the additional information of the slave image capture apparatus is not set to be displayed in step S504, the target luminance values specified by the user in FIG. 3E are additionally displayed in step S510, as illustrated in FIGS. 3G-3J.

When a target luminance is not set in step S509, the storage image generation unit 104 generates a storage image signal from the image signal developed by the development processing unit 103 in step S511. Also, the compression/expansion unit 107 compresses and encodes the storage image signal into a predetermined format and generates an image file, adds the additional information extracted in step S505 and/or the MaxCLL, MaxFALL, Min, AverageMaxCLL, AverageMin and the like calculated in step S506 to the image file as additional information, and stores the image file in the storage unit 108.

By the above-described process, the user can easily confirm a relationship between the frequency distributions (WFMs) of the luminance values of the images being shot and the maximum value, minimum value, and average value (MaxCLL, MaxFALL, Min) and a relationship between the maximum value, minimum value, and average value (MaxCLL, MaxFALL, Min) of the images being shot by the other image capture apparatuses.

Note, in the fourth embodiment, although the system is configured by adding new functional blocks to the image capture apparatus 100 of the first embodiment, the present embodiment is not limited to this, and for example, the system may be configured by adding new functional blocks to the image capture apparatus 100 of the second or third embodiments.

In the fourth embodiment, the functions of the master image capture apparatus 400 and the slave image capture apparatuses 500 to 504 have been described separately, but the present embodiment is not limited to this, and for example, the system may be configured by an image capture apparatus in which the functions of the master image capture apparatus 400 and the slave image capture apparatuses 500 to 504 are integrated. In this case, the user can assign which among a plurality of image capture apparatuses is to be the master image capture apparatus and the slave image capture apparatus, and can change the blocks that function.

Additionally, in the fourth embodiment, the target luminance values set by the master image capture apparatus 400 may be output to the slave image capture apparatuses 500 to 504, and may be superimposed on WFM images of the slave image capture apparatuses 500 to 504 for display. In this case, it is possible for a target luminance value to be inserted as additional information into the genlock signal outputted by the master image capture apparatus 400, and it is possible for the additional information to be extracted from the genlock signal by the slave image capture apparatuses 500 to 504, and superimposed on the WFM image for display.

Note that in each of the embodiments described above, configuration is taken such that the user confirms a range of the luminance values on a WFM image, but configuration may also be taken such that a range of the pixel component values (R, G, B) for each pixel may be confirmed on the WFM image. In this case, the luminance detection unit 105 calculates the maximum value of each pixel component value of the inputted RGB image signal as MaxCLL, the average value of each pixel component value as MaxFALL, and the minimum value of each pixel component value as Min.

In each of the embodiments described above, the present invention is applied to an image capture apparatus such as a digital video camera, but the present invention is not limited thereto. The present invention can be applied to any device having a WFM function and that is capable of calculating luminance levels of an image being shot and is capable of setting target levels. In other words, the present invention can be applied to an apparatus having a WFM function, such as a smart phone which is a type of cellular phone, a tablet device, a smart watch of a wristwatch type, or a wearable computer such as spectacle-type smart glasses.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-112127, filed Jun. 17, 2019 which is hereby incorporated by reference herein in its entirety.

What is claimed is:

1. An image processing apparatus comprising:
a memory and at least one processor and/or at least one circuit which function as:
an input unit configured to input an image;
a detection unit configured to detect a pixel value of each pixel of an input image and obtain at least one of a maximum value, a minimum value, and an average value of pixel values for each of predetermined sections of the input image;
a first image generation unit configured to generate a first image that is displayed in a waveform and indicates a frequency of pixel values of the input image, where a position of a pixel and a pixel value are associated;
a second image generation unit configured to generate a second image in which additional information including at least one of the maximum value, the minimum value, and the average value is superimposed on the first image; and
a display unit configured to superimpose the second image on the input image and display the superimposed image.

2. The apparatus according to claim 1, wherein the processor and/or the circuit function as a third image generation unit configured to generate a third image in which at least one of the first image and the second image are superimposed on the input image, and
wherein the display unit displays the third image.

3. The apparatus according to claim 1, wherein the processor and/or the circuit function as:
a setting unit configured to be able to set a target value of the additional information for the first image displayed on the display unit; and a storage unit configured to, in a case where a target value has been set by the setting unit, add the second image to which the target value was added to the input image and store the result, and
in a case where a target value has not been set by the setting unit, add at least one of the first image and the second image to the input image and store the result.

4. The apparatus according to claim 3, wherein the processor and/or the circuit function as an output unit configured to add the second image to which the target value was added to the input image and output the result.

5. The apparatus according to claim 3, wherein
the input unit generates an image based on the target value.

6. The apparatus according to claim 5, wherein
the input unit includes an image capturing unit configured to capture an image by adjusting exposure during shooting within a range of the target value.

7. The apparatus according to claim 1, wherein
the pixel value is a luminance value or a pixel component value.

8. A system which includes a first image capture apparatus and a second image capture apparatus, and synchronizes a capturing operation in the first image capture apparatus and a capturing operation in the second image capture apparatus by a synchronization signal outputted from the first image capture apparatus,
wherein the first image capture apparatus has a memory and at least one processor and/or at least one circuit which function as:
a detection unit configured to detect a pixel value of each pixel of a shot image and obtain at least one of a maximum value, a minimum value, and an average value of pixel values for each of predetermined sections of the shot image;
a first image generation unit configured to generate a first image indicating a frequency of pixel values of the shot image, where a position of a pixel and a pixel value are associated;
a second image generation unit configured to generate a second image in which additional information including at least one of the maximum value, the minimum value, and the average value is superimposed on the first image; and
a display unit configured to display the second image superimposed on the shot image of the first image capture apparatus;
an output unit configured to output a synchronization signal to the second image capture apparatus,
wherein the second image capture apparatus has a memory and at least one processor and/or at least one circuit which function as:
an input unit configured to input a synchronization signal outputted from the first image capture apparatus;
a detection unit configured to detect a pixel value of each pixel of a shot image of the second image capture apparatus and obtain at least one of a maximum value, a minimum value, and an average value of pixel values for each of predetermined sections of the shot image;
a third image generation unit configured to generate a third image indicating a frequency of pixel values of the shot image, where a position of a pixel and a pixel value are associated;
a fourth image generation unit configured to generate a fourth image in which additional information including at least one of the maximum value, the minimum value, and the average value is superimposed on the third image; and an output unit configured to output to the first image capture apparatus a response signal into which the additional information is inserted in response to the synchronization signal, wherein the processor and/or the circuit of the first image capture apparatus further function as:

an extraction unit configured to extract additional information included in the response signal outputted by the output unit of the second image capture apparatus, a generation unit configured to generate a fifth image in which the additional information is superimposed on at least one of the first image and the second image, and a display unit configured to superimpose the fifth image on the shot image and display the superimposed image.

9. An image capture apparatus comprising:

a memory and at least one processor and/or at least one circuit which function as:

an output unit configured to output a synchronization signal for synchronizing an image capturing operation with another image capture apparatus;

a detection unit configured to detect a pixel value of each pixel of a shot image and obtain at least one of a maximum value, a minimum value, and an average value of pixel values for each of predetermined sections of the shot image;

a first image generation unit configured to generate a first image indicating a frequency of pixel values of the shot image, where a position of a pixel and a pixel value are associated;

a second image generation unit configured to generate a second image in which additional information including at least one of the maximum value, the minimum value, and the average value is superimposed on the first image;

a display unit configured to superimpose the second image on the shot image and display the superimposed image;

an extraction unit configured to extract additional information detected from a shot image of the other image capture apparatus included in a response signal outputted by the other image capture apparatus with respect to a synchronization signal outputted to the other image capture apparatus; and a generation unit configured to generate a third image in which the additional information is superimposed on at least one of the first image and the second image, wherein a pixel value of each pixel of a shot image of the other image capture apparatus is detected and the additional information includes at least one of a maximum value, a minimum value, and an average value of pixel values for each of predetermined sections of the shot image.

10. The apparatus according to claim 9, wherein the processor and/or the circuit function as:

a setting unit configured to set a target value of the additional information for the first image displayed on the display unit; and a storage unit configured to, in a case where a target value has been set by the setting unit, add the target value and the third image to the shot image and store the result, and in a case where a target value has not been set by the setting unit, add at least one of the first image and the second image, and the third image to the shot image and store the result.

11. An image capture apparatus comprising:

a memory and at least one processor and/or at least one circuit which functions as:

an input unit configured to input a synchronization signal for synchronizing an image capturing operation with another image capture apparatus;

a detection unit configured to detect a pixel value of each pixel of a shot image and obtain at least one of a maximum value, a minimum value, and an average value of pixel values for each of predetermined sections of the shot image;

a first image generation unit configured to generate a first image that is displayed in a waveform and indicates a frequency of pixel values of the shot image, where a position of a pixel and a pixel value are associated;

a second image generation unit configured to generate a second image in which additional information including at least one of the maximum value, the minimum value, and the average value is superimposed on the first image; and an output unit configured to output to the other image capture apparatus a response signal into which the additional information is inserted.

12. The apparatus according to claim 11, wherein the processor and/or the circuit function as:

a display unit configured to superimpose the first image or the second image on the shot image and display the superimposed image;

a setting unit configured to set a target value of the additional information for the first image displayed on the display unit; and wherein of the output unit outputs a response signal into which the target value is inserted.

13. The apparatus according to claim 12, wherein the processor and/or the circuit function as, in a case where a target value is set by the setting unit, a storage unit configured to add the target value and the first image or the second image to the shot image and store thereof, and in a case where a target value has not been set by the setting unit, add at least one of the first image and the second image to the shot image and store the result.

14. An image processing method comprising:

inputting an image;

detecting a pixel value of each pixel of an input image and obtaining at least one of a maximum value, a minimum value, and an average value of pixel values for each of predetermined sections of the input image;

generating a first image that is displayed in a waveform and indicates a frequency of pixel values of the input image, where a position of a pixel and a pixel value are associated;

generating a second image in which additional information including at least one of the maximum value, the minimum value, and the average value is superimposed on the first image; and superimposing the second image on the input image and displaying the superimposed image.

15. A method of controlling an image capture apparatus which detects a pixel value of each pixel of a shot image and obtain at least one of a maximum value, a minimum value, and an average value of pixel values for each of predetermined sections of the shot image; generates a first image indicating a frequency of pixel values of the shot image, where a position of a pixel and a pixel value are associated; generates a second image in which additional information including at least one of the maximum value, the minimum value, and the average value is superimposed on the first image; and superimposes the second image on the shot image and display the result, the method comprising:

outputting a synchronization signal for synchronizing an image capturing operation with another image capture apparatus;

extracting additional information detected from a shot image of the other image capture apparatus included in a response signal outputted by the other image capture apparatus with respect to a synchronization signal outputted to the other image capture apparatus; and generating a third image in which the additional information is superimposed on at least one of the first image and the second image, wherein a pixel value of each pixel of a shot image of the other image capture apparatus is detected and the additional information includes at least one of a maximum value, a minimum value, and an average value of pixel values for each of predetermined sections of the shot image.

16. A method of controlling an image capture apparatus which detects a pixel value of each pixel of a shot image and obtain at least one of a maximum value, a minimum value, and an average value of pixel values for each of predetermined sections of the shot image; generates a first image that is displayed in a waveform and indicates a frequency of pixel values of the shot image, where a position of a pixel and a pixel value are associated; and generates a second image in which additional information including at least one of the maximum value, the minimum value, and the average value is superimposed on the first image, the method comprising:

inputting a synchronization signal for synchronizing an image capturing operation with another image capture apparatus; and outputting to the other image capture apparatus a response signal into which the additional information is inserted.

17. A non-transitory computer-readable storage medium storing a program for causing a computer to execute an image processing method comprising:

inputting an image;

detecting a pixel value of each pixel of an input image and obtaining at least one of a maximum value, a minimum value, and an average value of pixel values for each of predetermined sections of the input image;

generating a first image that is displayed in a waveform and indicates a frequency of pixel values of the input image, where a position of a pixel and a pixel value are associated;

generating a second image in which additional information including at least one of the maximum value, the minimum value, and the average value is superimposed on the first image; and superimposing the second image on the input image and displaying the superimposed image.

18. A non-transitory computer-readable storage medium storing a program for causing a computer to execute a method of controlling an image capture apparatus which detects a pixel value of each pixel of a shot image and obtain at least one of a maximum value, a minimum value, and an average value of pixel values for each of predetermined sections of the shot image; generates a first image indicating a frequency of pixel values of the shot image, where a position of a pixel and a pixel value are associated; generates a second image in which additional information including at least one of the maximum value, the minimum value, and the average value is superimposed on the first image; and superimposes the second image on the shot image and display the result, the method comprising:

outputting a synchronization signal for synchronizing an image capturing operation with another image capture apparatus;

extracting additional information detected from a shot image of the other image capture apparatus included in a response signal outputted by the other image capture apparatus with respect to a synchronization signal outputted to the other image capture apparatus; and generating a third image in which the additional information is superimposed on at least one of the first image and the second image, wherein a pixel value of each pixel of a shot image of the other image capture apparatus is detected and the additional information includes at least one of a maximum value, a minimum value, and an average value of pixel values for each of predetermined sections of the shot image.

19. A non-transitory computer-readable storage medium storing a program for causing a computer to execute a method of controlling an image capture apparatus which detects a pixel value of each pixel of a shot image and obtain at least one of a maximum value, a minimum value, and an average value of pixel values for each of predetermined sections of the shot image; generates a first image that is displayed in a waveform and indicates a frequency of pixel values of the shot image, where a position of a pixel and a pixel value are associated; and generates a second image in which additional information including at least one of the maximum value, the minimum value, and the average value is superimposed on the first image, the method comprising:

inputting a synchronization signal for synchronizing an image capturing operation with another image capture apparatus; and outputting to the other image capture apparatus a response signal into which the additional information is inserted.

* * * * *